United States Patent [19]

Holland

[11] Patent Number: 5,140,911
[45] Date of Patent: Aug. 25, 1992

[54] COAL DUST CONTAINMENT

[75] Inventor: Douglas K. Holland, Rialto, Calif.

[73] Assignee: Texaco Inc., White Plains, N.Y.

[21] Appl. No.: 619,534

[22] Filed: Nov. 29, 1990

[51] Int. Cl.⁵ .............................................. B61D 39/00
[52] U.S. Cl. ................................... 105/377; 414/291; 414/375
[58] Field of Search .................... 105/377, 241.2; 414/375, 291, 304; 299/12, 18; 209/138; 141/93; 98/115.1

[56] References Cited

U.S. PATENT DOCUMENTS

| | | | |
|---|---|---|---|
| 2,255,448 | 9/1941 | Morris | 414/291 |
| 4,604,023 | 8/1986 | Musschoot | 414/375 |

Primary Examiner—Robert J. Oberleitner
Assistant Examiner—Kevin D. Rutherford
Attorney, Agent, or Firm—Robert A. Kulason; James J. O'Loughlin; Robert B. Burns

[57] ABSTRACT

A car shaker for use particularly on a rail type hopper car. At least one closure and preferably a plurality thereof is provided to preclude or minimize the amount of dust which results from a dust carrying cargo being discharged. The at least one closure rests on the top of the hopper car to preclude coal dust entering the atmosphere. The car shaker is further provided with an aspiration system to draw away cargo dust which has been wetted by water sprays from a manifold carried on the closures.

2 Claims, 1 Drawing Sheet

5,140,911

COAL DUST CONTAINMENT

BACKGROUND OF THE INVENTION

Field of the Invention

In any industry where the use of coal requires handling of large quantities, a recurring problem is the presence of coal dust. The latter occurs as a result of the ordinary handling of coal since dust is continually generated so long as the coal is moved about or transported.

For example, when large quantities of coal are transported by rail, the coal is deposited into a hopper-containing car, referred to hereinafter as a hopper car. The latter includes a series of hopper-like containers having open tops and constricted discharge openings at the bottom. For discharging this dust-containing cargo, the hopper car is first positioned over a receptacle such as a storage bin, tank or the like. Thereafter the bottom discharge ports are opened, permitting the coal to fall by gravity into the containing receptacle.

To facilitate removal of the coal, which under some circumstances can become jammed in the hopper, the hopper car is submitted to a shaking or vibratory action. This normally loosens the coal mass such that it is free to flow through the discharge openings.

It can be appreciated that the unloading of such a cargo can result in the accumulation of a considerable amount of coal dust. Some of the latter will be carried along with the flowing coal and pass into the storage facility. On the other hand, it has been found that the downwardly moving coal mass when replaced with air, will force the coal dust upwardly through the top opening of the hopper car thereby driving the dust into the atmosphere.

It has been determine through necessity and practice that to simplify the unloading of coal from a hopper car, the use of a car shaker or vibrator can be helpful. Such an apparatus is one that is motor driven and removably fixed to a hopper car at the time of unloading. The shaker mechanism normally includes a member which extends across the top opening of the hopper car. Thereafter, as the shaker vibrates, the entire hopper car will be comparably shaken, thus promoting the loosening and downward flow of the coal cargo.

To minimize the discharge of coal dust into the atmosphere, it has been found that applying a liquid such as water into the coal discharge area, can minimize or dampen the discharge of dust.

Toward overcoming or minimizing this undesirable factor of coal dust polluting an unloading area, the present apparatus is addressed to a dust confinement means which cooperates with a hopper car shaker in a manner to accumulate and collect the dust which ordinarily remains after the coal is discharged. The dust confinement means is comprised in brief of a flexible wall member which is internally supported to define a chamber or partial enclosure across the top of the hopper car shaker. The dust confining apparatus is sealably fixed to the top opening of the car shaker so that as a load is discharged from the hopper car, the coal dust will rise up into the flexible walled compartment.

Concurrently, the dust confinement means includes spray nozzles directed into the collecting or intermediate compartment whereby a file mist or water spray can be discharged therein to contact the dust particles.

The dust accumulating compartment is communicated with a reduced pressure source such as a bag house, which will maintain a reduced pressure in the compartment once it has been sealably fixed, thereby aspirating the major part of the dust and very light liquid droplets into the bag house.

It is therefore an object of the invention to provide means to minimize the loss of coal dust during a cargo discharging operation from a hopper car. A further object is to confine and collect coal dust which results from the discharge of a cargo of coal from a hopper car into a storage means. A still further object is to create a safe and clean environment for workers in an area where coal is ordinarily unloaded from hopper cars and into a storage area.

Figure 1:
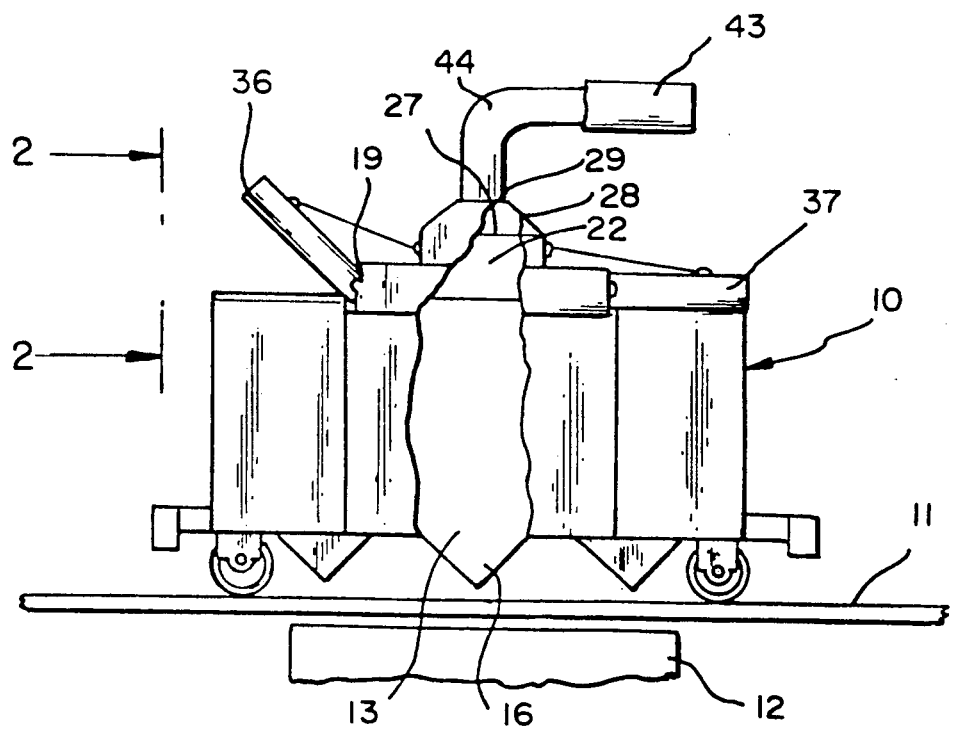
FIG. 1 is a view of the present car shaker apparatus as applied to a coal holding hopper car.
Figure 2:
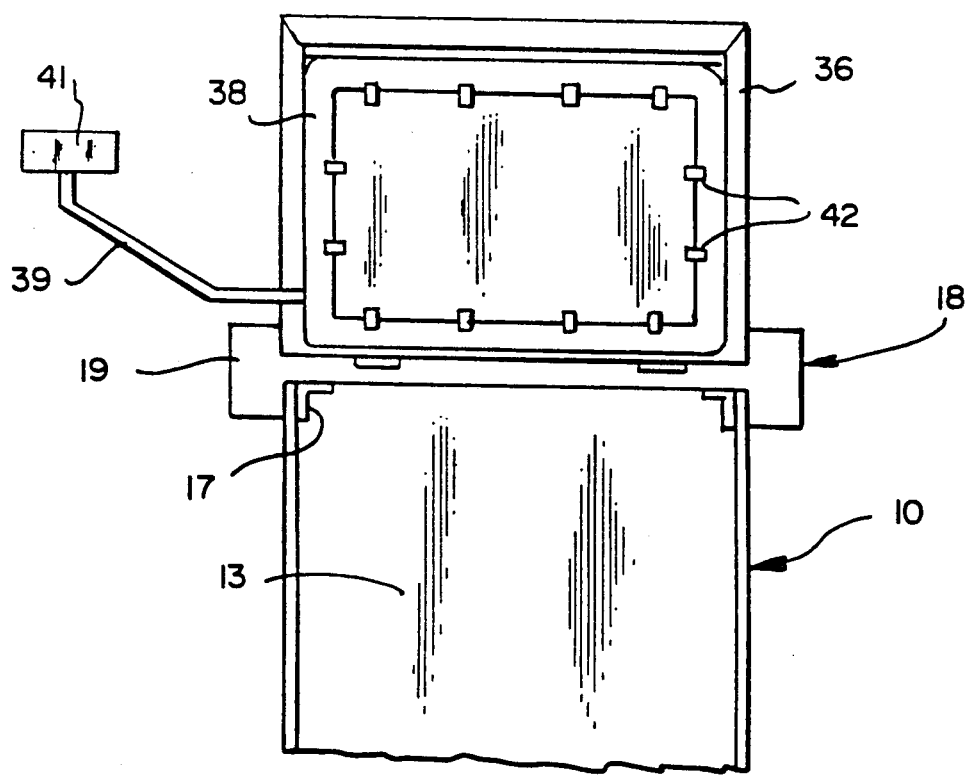
FIG. 2 is a segmentary view of a cover hinge.

Referring to the drawings, the invention in brief is concerned with a hopper car 10 of the type normally associated with railroad transport. As shown, the latter is mobile, being mounted on rails 11, so it can be readily moved to a position above a storage tank 12. Hopper car 10 is comprised generally of a steel structured member which encloses a plurality of internal hoppers 13. The latter are normally open at the top whereby coal can be inloaded. The side walls of the hopper are progressively tapered toward the lower end where they terminate at a narrowed discharge port 16.

To strengthen the upper or top end of the car, the latter can be provided with reinforcing members such as steel angle irons 17 or the like which define the periphery of the car inlet.

The car shaker 18 here contemplated is one of the type which can be lowered onto hopper car 10 such that the edges of the shaker can be detachably fixed to the hopper car upper framework or peripheral edge. A drive mechanism not presently shown, but which is associated with the car shaker, includes an electric motor which when operating, causes the shaker to vibrate. This movement is transmitted into the framework of the hopper car, thereby causing the entire car to shake.

Structurally, and as here shown, one embodiment of car shaker 18 can be comprised of a body 19 which extends across the hopper car upper surface. A covering extending from opposite sides of the shaker 18 forms a closure above the top of the car's compartment to confine upwardly rising dust which is ordinarily released during unloading. Shaker body 19 includes a central opening or passage 22 through which dust rises or is drawn will be herein described.

The dust confinement apparatus 26 which is associated with car shaker 18, includes primarily a base member 27 which forms a peripheral rim. Said rim is sufficiently rigid to support the dust confining element comprised primarily of upwardly extending steel framework 28. The latter defines a generally constrictive or conical structure which terminates at a top plate 29. The framework members are preferably welded together to support a flexible jacket 31. The latter, when positioned on framework 28, defines an intermediate compartment 32 adjacent to the car shaker discharge opening.

Confining of dust to the hopper car during a coal discharge operation is prompted by at least one, and preferably by a pair of covers 36, 37. The latter depend from shaker body 19 at hinges 33 and 34. Functionally, the respective covers 36 and 37 can be actuated into a lowered or closure position across the hopper car during discharge of the coal. Preferably, the covers form a contact seal with the hopper car upper rim to avoid the release of coal dust into the adjoining atmosphere.

The covers, on the other hand, are pivotally adjusted to an upper position. In such a position, they can be raised with respect to the car shaker or detached completely therefrom as required.

To further limit or preclude coal dust from emerging from the car, covers 36 and 37 can be provided with means for spraying water into the hopper. As shown, each cover 36, for example, is furnished at its underside with a manifold 38 which is positioned about the periphery of the hopper and adjacent to the cover 36 outer edge.

Manifold 38 is communicated by conduit 39 which extends to a pressurized source of water 41. During a coal discharge operation, water from said source is delivered in a spray from nozzles 42, about the hopper compartment to contact coal dust which would otherwise rise during the normal discharge in response to air rushing into the hopper lower end.

Water dampened coal dust will be shaken loose as the coal falls to the hopper discharge port 16. The dust will then be aspirated toward the center, confinement apparatus defined by jacket 31.

The latter is communicated with bag house 43 by way of conductor 44 which engages plate 29. A pump or blower means at the bag house 43 also communicated with conductor 44, operates to establish a partial vacuum or reduced pressure in the hopper area, thereby drawing the wetted dust into the bag house 43. From the latter the dust can be disposed of in a suitable manner without disturbing or degrading the environment.

It is understood that although modification and variations of the invention can be made without departing from the spirit and scope thereof, only such limitations should be imposed as are indicated in the appended claims.

I claim:

1. A car shaker for engaging the upper port of a hopper car holding dust carrying cargo, said car shaker having means for shaking the car and for collecting the dust which is released from said cargo, the improvement in said car shaker which includes,
    at least one cover operably engaging said car shaker and being adjustable to a position across said hopper car top opening,
    a manifold depending from said at least one cover and communicated with a source of water for delivering water sprays onto said dust carrying cargo,
    and means in said car shaker for aspirating said dust from the cargo.

2. In the apparatus as defined in claim 1 wherein said manifold includes a plurality of nozzles spaced about said manifold for delivering a plurality of water streams onto said dust carrying cargo.

* * * * *